K. BOTNEN.
CORN PLANTER.
APPLICATION FILED MAY 9, 1912.
1,087,918.
Patented Feb. 24, 1914.
2 SHEETS—SHEET 1.
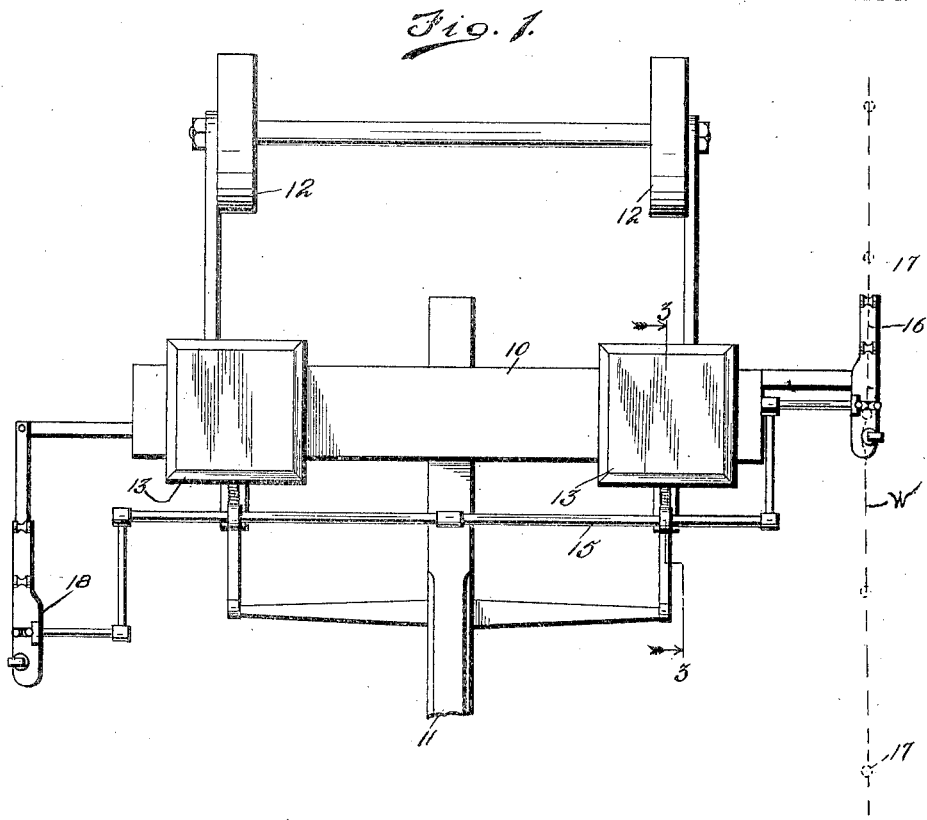
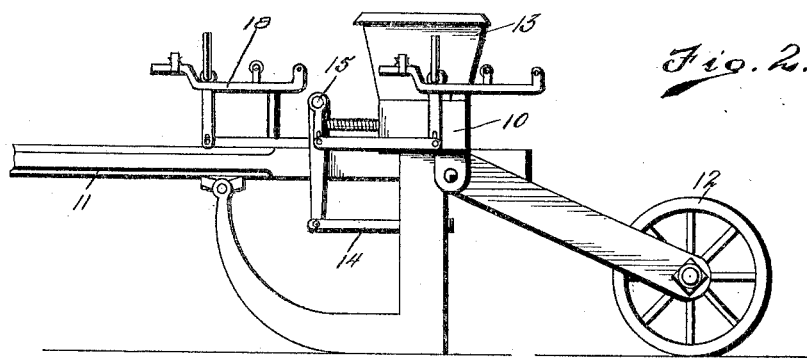
Witnesses
Inventor
K. Botnen.
By
Attorneys

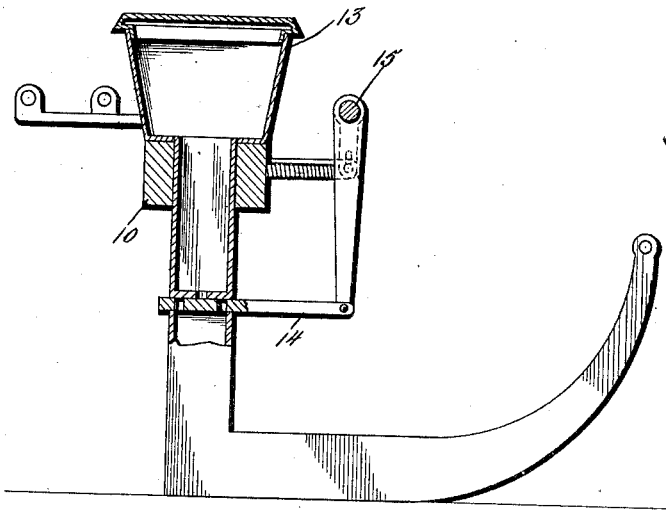
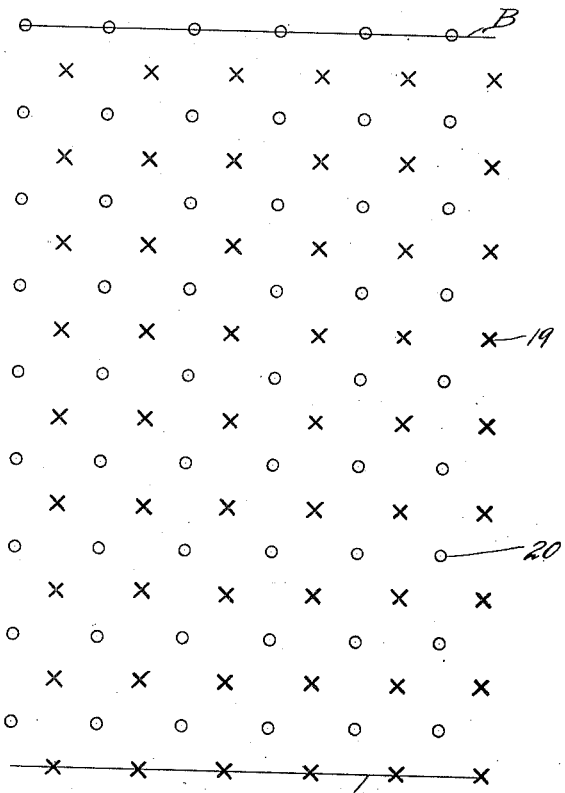

UNITED STATES PATENT OFFICE.

KNUDT BOTNEN, OF DUNBAR, IOWA.

CORN-PLANTER.

1,087,918.   Specification of Letters Patent.   Patented Feb. 24, 1914.

Application filed May 9, 1912. Serial No. 696,172.

*To all whom it may concern:*

Be it known that I, KNUDT BOTNEN, a citizen of the United States, residing at Dunbar, in the county of Marshall, State of Iowa, have invented certain new and useful Improvements in Corn-Planters; and I do hereby declare the following to be a full, clear, and exact description of the invention, such as will enable others skilled in the art to which it appertains to make and use the same.

This invention relates to new and useful improvements in machines for planting corn, or other seeds of like nature.

The object of the present invention resides in the provision of a machine for planting seed in such spaced relation that the cultivation of the plants will be rendered easy and may be accomplished without the risk of injury to said plants.

A further object of this invention is the provision of a machine which will answer the above purpose and which will be comparatively simple and inexpensive to manufacture, reliable and efficient in use and readily operated.

With the above and other objects in view, this invention resides in the novel features of construction, formations, combinations and arrangements of parts to be hereinafter more fully described, claimed and illustrated in the accompanying drawings, in which:

Figure 1 is a top plan view of my invention. Fig 2 is a side elevation thereof, Fig. 3 is a longitudinal sectional view taken on the line 3—3 of Fig. 1, and Fig. 4 is a diagrammatic plan view showing the manner in which the seed is planted with my device.

Referring to the accompanying drawings by similar characters of reference, the numeral 10 designates generally the frame of a corn planter which is provided with the usual tongue 11 and which is mounted upon the customary supporting wheels 12. The usual hoppers 13 are disposed upon the opposite sides of the tongue 11 and are secured in the usual manner to the frame 10. These hoppers 13 are provided with the usual corn-dropping attachments 14 which are simultaneously operated from a rock shaft 15 which is journaled centrally on the tongue 11 and to which they are connected in any suitable manner.

In operating my corn planter, I double plant the field as the machine proceeds and therefore in so doing I employ a planter which must be twice as wide as the distance between the rows. For instance, if it is desired to have the rows thirty inches apart, the planter employed will be sixty inches wide. Referring to Fig. 4, wherein the crosses marked 19 and the small circles marked 20 indicate rows planted in conformity with my invention, the distance between each row of crosses will be the same as the width of the planter which is also equal to the distance between the small circles or the rows 20 so that if we proceed to plant in the direction from A to B, when the line B should be reached, the planter would be turned and proceed back toward A dropping the rows 20 which would straddle the rows 19. In the machine shown in Fig. 1, the check rower 18 is set forward a certain distance relative to the shaft 15, while the check rower 16 is set toward the rear of the machine relative to the shaft the same distance as the check 18 is forward.

For instance, if the buttons or knots 17 on the checking wire W are thirty inches apart, the checking fork of the checker 16 should be fifteen inches to the rear of the checking shaft, while the form of the checker 18 should be fifteen inches forward.

In operation the machine is started with the checking wire on one side of the planter, and the rows of hills, for instance those represented at 19 in Fig. 4 are planted. When the end of the field is reached the machine is turned and the check wire is placed on the opposite side so that on the return trip, the rows 20 which straddle the rows 19 will be planted.

It will be seen that by the use of my planter the hills 19 will aline both longitudinally and transversely of the field, as is also the case with the hills 20. It will further be seen that the hills 19 and 20 are arranged both longitudinally and transversely of the field in staggered relation to each other which makes possible the successful cultivation thereof in the manner hereinbefore described.

Having thus fully described this invention what I claim as new and desire to protect by Letters Patent, is:

In a corn planter, a cross beam, a draft tongue attached thereto, hoppers on the opposite ends of said beam, a dropping mechanism attached to each hopper, a rock shaft journaled at the center on said tongue and arranged in advance of both hoppers, and extending parallel to said beam, a check row fork operatively connected to one end of said shaft and extending forwardly thereof, and a check row fork operatively connected to the opposite end of said shaft and extending rearwardly therefrom, said forks being adapted for interchangeable engagement with the stops of a check wire, and each being disposed at the same distance from said shaft.

In testimony whereof, I affix my signature, in presence of two witnesses.

KNUDT BOTNEN.

Witnesses:
H. H. STEFFENS,
C. H. SMITH.